(12) United States Patent
Fu et al.

(10) Patent No.: US 11,221,518 B2
(45) Date of Patent: Jan. 11, 2022

(54) BACKLIGHT MODULE AND DISPLAY PANEL

(71) Applicant: TCL CHINA STAR OPTOELECTRONICS TECHNOLOGY CO., LTD., Guangdong (CN)

(72) Inventors: Linlin Fu, Guangdong (CN); Dehua Li, Guangdong (CN); Xin Zhang, Guangdong (CN)

(73) Assignee: TCL CHINA STAR OPTOELECTRONICS TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 16/957,119

(22) PCT Filed: May 20, 2020

(86) PCT No.: PCT/CN2020/091151
§ 371 (c)(1),
(2) Date: Jun. 23, 2020

(65) Prior Publication Data
US 2021/0349350 A1 Nov. 11, 2021

(51) Int. Cl.
*G02F 1/13357* (2006.01)
*G02F 1/1335* (2006.01)

(52) U.S. Cl.
CPC .. *G02F 1/133611* (2013.01); *G02F 1/133603* (2013.01); *G02F 1/133605* (2013.01); *G02F 1/133606* (2013.01); *G02F 1/133612* (2021.01)

(58) Field of Classification Search
CPC ......... G02F 1/133611; G02F 1/133605; G02F 1/133603; G02F 1/133606; G02F 1/133612
See application file for complete search history.

(56) References Cited

U.S. PATENT DOCUMENTS 9,223,173 B2 * 12/2015 Park .................... G02B 6/0023
2007/0176885 A1    8/2007 Jun
(Continued)

FOREIGN PATENT DOCUMENTS

| CN | 101013229 A | 8/2007 |
| CN | 101749668 A | 6/2010 |

(Continued)

OTHER PUBLICATIONS

English machine Translation of Chen CN101994951A, published Mar. 30, 2011 (Year: 2011).*

*Primary Examiner* — Evan P Dzierzynski
(74) *Attorney, Agent, or Firm* — Mark M. Friedman

(57) ABSTRACT

The embodiments of the present application provided a backlight module and a display panel. By disposing a reflective layer on the substrate and disposing vias, whose areas gradually decrease from the side close to an electric current input side to the side away from the electric current input side, on the reflective layer, the backlight module reduces the brightness of a light emitting device layer close to the electric current input side and increase the brightness of the light emitting device layer away from the electric current input side. Thus the brightness of both sides of the light emitting devise layer is uniform, and thus the backlight uniformity of the backlight module is increased.

18 Claims, 3 Drawing Sheets

(56) References Cited

U.S. PATENT DOCUMENTS

| | | | |
|---|---|---|---|
| 2009/0225396 A1* | 9/2009 | Sampsell | G02B 26/001 |
| | | | 359/292 |
| 2013/0100648 A1 | 4/2013 | Nozawa | |
| 2014/0085344 A1 | 3/2014 | Jung | |
| 2015/0117052 A1* | 4/2015 | Hsu | F21K 9/64 |
| | | | 362/606 |
| 2015/0261042 A1* | 9/2015 | Sugaya | G02F 1/133605 |
| | | | 349/69 |
| 2019/0212613 A1* | 7/2019 | Yasunaga | G02F 1/133605 |
| 2020/0089051 A1* | 3/2020 | Watanabe | G02F 1/133553 |

FOREIGN PATENT DOCUMENTS

| | | |
|---|---|---|
| CN | 101994951 A | 3/2011 |
| CN | 203349160 U | 12/2013 |
| CN | 103672585 A | 3/2014 |
| CN | 109616011 A | 4/2019 |
| CN | 110221476 A | 9/2019 |

* cited by examiner

BACKLIGHT MODULE AND DISPLAY PANEL

FIELD OF INVENTION

The present invention relates to the technical field of display, and especially relates to a backlight module and display panel.

BACKGROUND OF INVENTION

With the development of liquid crystal display (LCD) panel technology, consumers have increasingly higher requirements for image quality. Mini-light emitting diode (Mini-LED) backlight technology is a new type of backlight technology that can provide localized light control of multiple partitions, greatly improving the dynamic contrast ratio of LCD panels, and thereby enhancing user experience.

At present, one of the Mini-LED backlight implementation solutions is an AM-Mini-LED backlight module, which realizes lighting by means of voltage driving. Because power cords of a lamp plate has certain impedance, and because driving current of all pixels is provided by a power source VDD, the supply voltage in the area in the backplane closer to the power source VDD is higher than that in the area farther from the power source VDD. This phenomenon is called IR drop. Since the voltage of the power source VDD relates to the current, IR drop also causes current differences in different areas, which may cause brightness mura of a backlight module.

Technical Problem

Since the voltage of the power source VDD is related to the current, IR drop also cause current differences in different areas, which may cause brightness mura of the backlight module.

SUMMARY OF INVENTION

Technical Solution

The embodiments of the present application provide a backlight module and display panel that can solve the problem of brightness mura of a backlight module.

According to a first aspect of the invention, the embodiment of the present application provides a backlight module, comprises:

a substrate on which a plurality of pads arranged in array are disposed;

a reflective layer disposed on the substrate, wherein vias which expose the pads are defined by the reflective layer;

a light emitting device layer disposed on the reflective layer, wherein the light emitting device layer comprises a plurality of light emitting devices electrically connected with the pads though the vias, and areas of the vias are in positive correlation with brightness of the light emitting devices; and a package layer disposed on the light emitting device layer.

In the backlight module provided by the embodiments of the present application, the substrate comprises an electric current input side, the areas of the vias close to the electric current input side are larger than the areas of the vias away from the electric current input side.

In the backlight module provided by the embodiments of the present application, the light emitting device is a blue light emitting diode.

In the backlight module provided by the embodiments of the present application, the substrate further comprises an optical film layer which is disposed on the package layer.

In the backlight module provided by the embodiments of the present application, the optical film layer comprises a quantum dot film, a prism sheet, a diffuser film and a brightness enhancement film which are sequentially stacked and disposed on the package layer.

In the backlight module provided by the embodiments of the present application, the package layer is made of transparent materials.

In the backlight module provided by the embodiments of the present application, the material of the reflective layer is white ink.

In the backlight module provided by the embodiments of the present application, the light emitting device comprises red light emitting diodes, green light emitting diodes and blue light emitting diodes, one of the red light emitting diodes, one of the green light emitting diodes and one of the blue light emitting diodes are arranged alongside with one another laterally or longitudinally forming a light emitting unit.

In the backlight module provided by the embodiments of the present application, a plurality of the light emitting units are arranged in array.

In the backlight module provided by the embodiments of the present application, a circuit board is disposed on the substrate, and the circuit board is used for driving the light emitting devices to emit light.

According to a second aspect of the invention, the embodiment of the present application provides a display panel, comprising:

a substrate on which a plurality of pads arranged in array are disposed;

a reflective layer disposed on the substrate, vias which expose the pads are defined by the reflective layer;

a light emitting device layer disposed on the reflective layer, wherein the light emitting device layer comprises a plurality of light emitting devices electrically connected with the pads though the vias, and areas of the vias are in positive correlation with brightness of the light emitting devices; and a package layer disposed on the light emitting device layer.

In the display panel provided by the embodiments of the present application, the substrate comprises an electric current input side, the areas of the vias close to the electric current input side are larger than the areas of the vias away from the electric current input side.

In the display panel provided by the embodiments of the present application, the light emitting device is a blue light emitting diode.

In the display panel provided by the embodiments of the present application, the substrate further comprises an optical film layer which is disposed on the package layer.

In the display panel provided by the embodiments of the present application, the optical film layer comprises a quantum dot film, a prism sheet, a diffuser film and a brightness enhancement film which are sequentially stacked and disposed on the package layer.

In the display panel provided by the embodiments of the present application, the package layer is made of transparent materials.

In the display panel provided by the embodiments of the present application, the material of the reflective layer is white ink.

In the display panel provided by the embodiments of the present application, the light emitting device comprises red light emitting diodes, green light emitting diodes and blue light emitting diodes, one of the red light emitting diodes, one of the green light emitting diodes and one of the blue light emitting diodes are arranged alongside with one another laterally or longitudinally forming a light emitting unit.

In the display panel provided by the embodiments of the present application, a plurality of the light emitting units are arranged in array.

In the display panel provided by the embodiments of the present application, a circuit board is disposed on the substrate, the circuit board is used for driving the light emitting devices to emit light.

Beneficial Effects

The backlight module provided by the embodiment of the present application comprises a substrate, a reflective layer, a light emitting device layer and a package layer; wherein a plurality of pads arranged in array are disposed on the substrate; the reflective layer is disposed on the substrate, vias which expose the pads are defined by the reflective layer; the light emitting device layer is disposed on the reflective layer and comprises a plurality of light emitting devices which are electrically connected with the pads though the vias. The areas of the vias are in positive correlation with the brightness of the light emitting devices. The package layer is disposed on the light emitting device layer. The solution can solve the problem of brightness mura of the backlight module.

DESCRIPTION OF DRAWINGS

To better explain the technical solution in the embodiments of the present application, the drawings needed in the description of the embodiments are briefly introduced hereinbelow. Obviously, the drawings in the following description are merely some embodiments of the present application. For one skilled in the art, other drawings may be obtained according to these drawings without paying any creative work.

DETAILED DESCRIPTION OF PREFERRED EMBODIMENTS

The technical solution in the embodiments of the present application is described clearly and integrally in conjunction with the drawings in the embodiments of the present application. Obviously, the embodiments described herein are merely a part of embodiments of the present application instead of all embodiments of the present application. Based on the embodiments in the present application, all other embodiments obtained by one skilled in the art without making creative work fall within the scope of protection of the present application.

The embodiments of the present application provides a backlight module and a display panel, which are described in detail hereinbelow, respectively.

Figure 1:
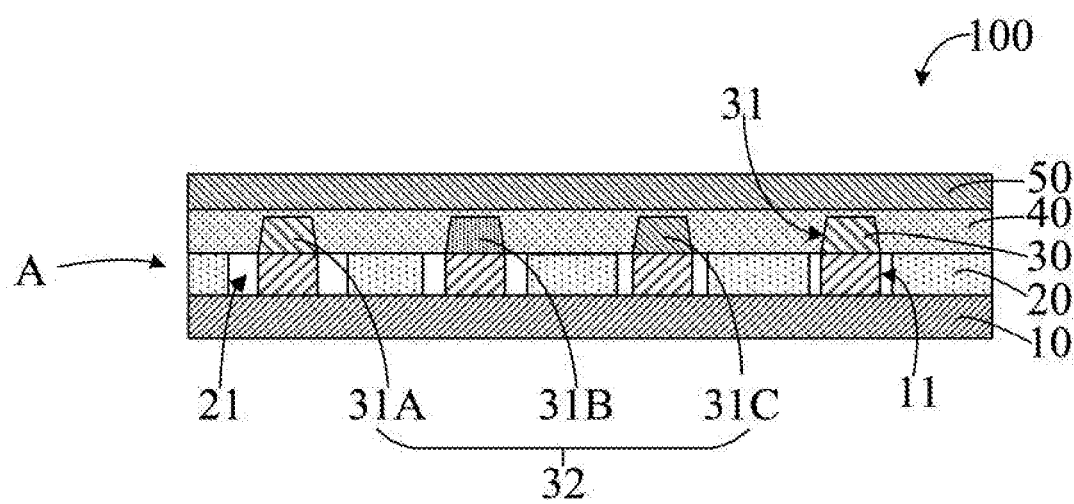
FIG. 1 is the structural schematic view of the backplane module provided by the embodiments of the present application.

Refer to FIG. 1. FIG. 1 is the structural schematic view of the backplane module provided by the embodiments of the present application. The backplane module 100 may comprises a substrate 10, a reflective layer 20, a light emitting device layer 30 and a package layer 40.

Wherein, a plurality of pads 11 arranged in array may be disposed on the substrate 10. The reflective layer 20 is disposed on the substrate 10, vias 21 which expose the pads 11 may be defined by the reflective layer 20. The light emitting device layer 30 is disposed on the reflective layer 20 and may comprises a plurality of light emitting devices 31 which may be electrically connected with the pads 11 though the vias 21. Wherein, the size of the vias 21 are in positive correlation with the brightness of the light emitting devices 31. The package layer 40 is disposed on the light emitting device layer 30.

It should be noted that the light emitting devices 31 in the embodiments of the present application is mini-light emitting diodes (Mini-LEDs).

It should be noted that since the substrate 10 itself which is formed of glass is not reflective to light, a reflective layer 20 may be coated on the substrate 10 to increase the reflected light of the light emitting devices 31, thus reducing the difference in brightness between both sides of the light emitting layer 30, and thus increasing the backlight uniformity of the backlight module 100.

It is to be understood that the substrate 10 provided with a circuit board, such as a printed circuit board (PCB). The substrate 10 may be used to drive the light emitting devise 31 to emit light.

It should be noted that since the electric current of the substrate 10 is inputted from a single direction. As the distance of wiring increases, the line loss of the voltage also increases. Therefore, the voltage in places which are close to the electric current input side A of the substrate 10 is larger than the voltage at places which are away from the electric current input side A. That is, the brightness of the light emitting devices 31 close to the electric current input side A of the substrate 10 is greater than the brightness of the light emitting devices 31 away from the electric current input side A. Therefore, although disposing the reflective layer 20 on the substrate 10 can reduce the brightness difference between the both sides of the light emitting device layer 30 to a certain extent, a difference still remains between the brightness of the both sides of the light emitting device layer 30.

In some embodiments, in order to further increase the backlight uniformity of the backlight module 100, vias 21 may be formed by reserving preset areas, which include the pads 11, and by not coating the preset areas in the coating process of the reflective layer 20. Wherein the material of the reflective layer 20 is white ink.

It can be understood that the preset areas (which are not coated with the reflective layer 20) are the areas of the vias 21. It can be noted that the areas of the vias 21 are the areas of the vias 21 parallel to the substrate 10.

Figure 2:
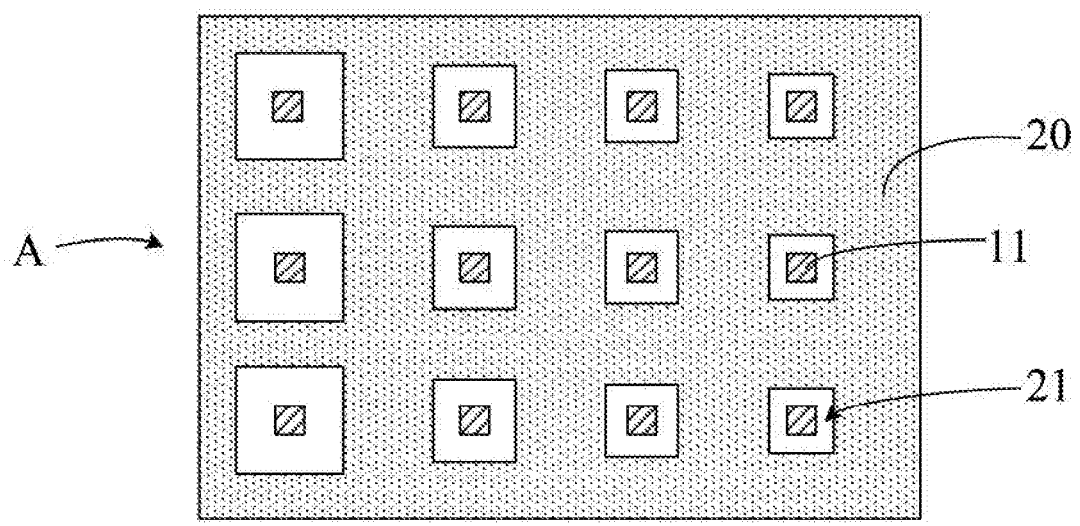
FIG. 2 is the top view of the substrate provided by the embodiments of the present application.

As shown in FIG. 2, the areas of the vias 21 close to the electric current input side A are larger than that of the vias 21 away from the electric current input side A. It can be understood that the areas of the vias 21 is in positive correlation with the brightness of the light emitting devices 31. That is, the areas of the vias 21 depend on the brightness of the light emitting devices 31. In some embodiments, the brightness of a first light emitting device 31 is N % higher than the brightness of a second light emitting device 31, and then the area of the via 21 at the position corresponding to the second light emitting device 31 is N % smaller than the area of the via 21 at the position corresponding to the first light emitting device 31.

At this time, when the light emitting device 31 emits light, since the areas of the vias 21 corresponds to the light emitting devices 31 close to an electric current input side A are large, the light of the light emitting devices 31 reflected by the reflective layer 20 may be reduced, thereby reducing the brightness of the light emitting device layer 30 close to the electric current input side A. The areas of the vias 21 corresponding to the light emitting devices 31 away from the electric current input side A are smaller, so the light from the light emitting devices 31 reflected by the reflective layer 20 may be increased, thereby increasing the brightness of the light emitting device layer 30 away from the electric current input side A.

From the above, in the present embodiment, the areas of the vias 21 are arranged to gradually decrease from where is close to the electric current input side A to where is away from the electric current input side A, thus to decrease the brightness of the light emitting device layer 30 where it is close to the electric current input side A and increases the brightness of the light emitting device layer 30 where it is away from the electric current input side A, and thereby making the brightness on both sides of the light emitting device layer 30 uniform, and thereby increasing the backlight uniformity of the backlight module 100.

Wherein, the light emitting device 31 may be a blue light emitting diode. In some embodiments, the light emitting devices 31 may comprises red light emitting diodes 31A, green light emitting diodes 31B and blue light emitting diodes 31C. One of the red light emitting diodes 31A, one of the green light emitting diodes 31B and one of the blue light emitting diodes 31C may be arranged alongside with one another laterally or longitudinally forming a light emitting unit 32.

Therefore, in the embodiment of the present application, when the backlight module 100 needs to emit monochromatic light, it can emit light by directly exciting one kind of the diodes(red light diodes 31A, green light diodes 31B or blue light diodes 31C) of the light emitting device layer 30. When the backlight module 100 needs to emit multiple colors, the red light diodes 31A, the green light diodes 31B and the blue light diodes 31C in the light emitting device layer 30 can be excited in combinations of different forms and emit white light in mixed light. In addition, the effect of adjusting color saturation may be achieved by controlling the number of the light emitting devices 31 which emit light in different light emitting device layers 30.

It can be understood that the light emitting device layer 30 may comprises the plurality of light emitting units 32 which may be arranged in array. At this time, since the light emitting device layer 30 in the embodiments of the present application can directly emit monochromatic light or multichromatic light. Therefore, it is not necessary to add phosphor to the package layer 40 in the embodiments of the present application, and the package layer 40 may be directly made of transparent martials. Therefore, the parasitic light in the backlight emitted by the backlight module 100 is reduced, and the backlight color saturation of the backlight module 100 is enhanced.

In some embodiments, the backlight module 100 may also comprises an optical film layer 50. The optical film layer 50 may be disposed on the package layer 40. The optical film layer 50 can brighten and diffuse the light emitted by the light emitting device layers 30. It can be understood that the optical film layer 50 may comprise a series of optical films, such as a quantum dot film, a prism sheet, a diffuser film, and a brightness enhancement film which are sequentially stacked and disposed on the package layer 40.

From the above, by disposing a reflective layer 20 on the substrate 10 and disposing vias 21, whose areas gradually decrease from the side close to the electric current input side A to the side away from the electric current input side A, on the reflective layer 20, the backlight module 100 provided by the embodiments of the present application reduces the brightness of the light emitting device layer 30 close to an electric current input side A and increase the brightness of the light emitting device layer 30 away from the electric current input side A. Thus the brightness of both sides of the light emitting devise layer 30 is uniform, and thus the backlight uniformity of the backlight module 100 is increased.

Figure 3:
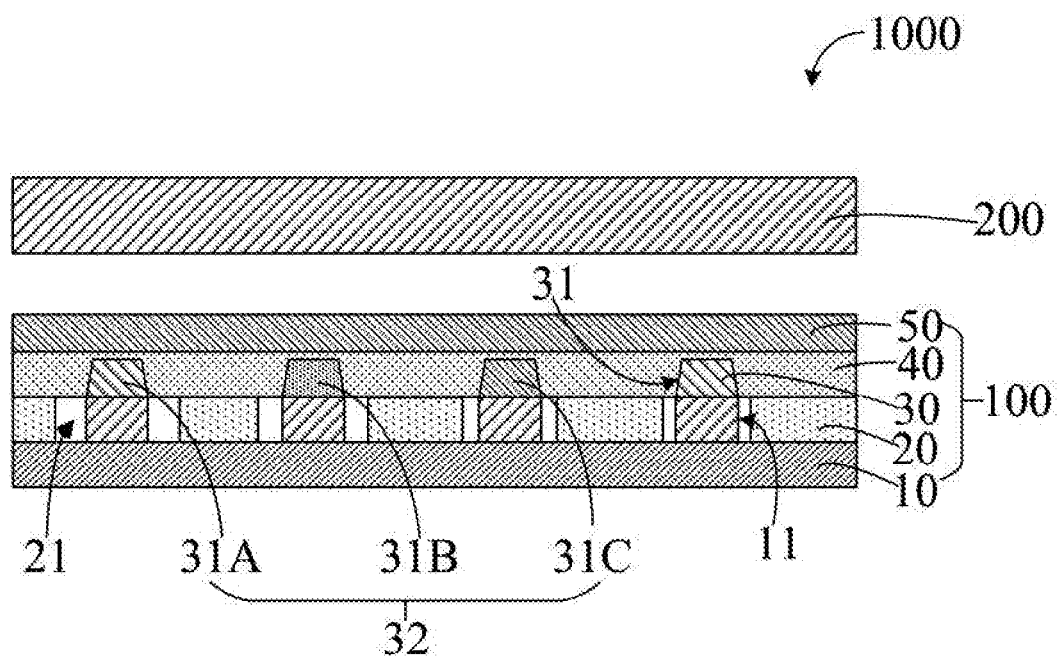
FIG. 3 is the structural schematic view of the display panel provided by the embodiments of the present application.

Refer to FIG. 3. FIG. 3 is the structural schematic view of the display panel provided by the embodiments of the present application. The display panel 1000 may comprises a backlight module 100 and a display screen 200.

Wherein the backlight module 100 may comprise a substrate 10, a reflective layer 20, a light emitting device layer 30, and a package layer 40.

Wherein, a plurality of pads 11 arranged in array may be disposed on the substrate 10. The reflective layer 20 is disposed on the substrate 10, vias 21 which expose the pads 11 may be defined by the reflective layer. The light emitting device layer 30 is disposed on the reflective layer 20 and may comprises a plurality of light emitting devices 31 which may be electrically connected with the pads 11 though the vias 21. Wherein the areas of the vias 21 are in positive correlation with the brightness of the light emitting devices 31. The package layer 40 is disposed on the light emitting device layer 30.

Therefore, by disposing a reflective layer 20 on the substrate 10 and disposing vias 21, whose areas gradually decreases from the side close to the electric current input side A to the side away from the electric current input side A on the reflective layer 20, the display panel 200 provided by the embodiments of the present application reduces the brightness of a light emitting device layer 30 close to the electric current input side A and increases the brightness of the light emitting device layer 30 away from the electric current input side A. Thus the brightness of both sides of the light emitting devise layer 30 is uniform, and thus the backlight uniformity of the display panel 200 is increased.

In the aforementioned embodiments, the description of each embodiment has its own emphasis. For a part that is not detailed in an embodiment, refer to related descriptions in other embodiments.

The backlight module and display panel provided by the embodiments of the present application are described in detail hereinabove. Specific examples are used herein to elaborate the principles and implementations of the present application. The description of the above embodiments are used only to help understand the technical solution and the main idea of the present application. It can be understood by one of ordinary skill in the art that modifications can still be made to the technical solution described in the aforementioned embodiments, or equivalent substitutions can be made to part of the technical features of the aforementioned embodiments without depart from the scope of the technical solutions of the embodiments of the present application.

What is claimed is:

1. A backlight module, comprising:
   a substrate on which a plurality of pads arranged in array are disposed;
   a reflective layer disposed on the substrate, wherein vias which expose the pads are defined by the reflective layer;
   a light emitting device layer disposed on the reflective layer, wherein the light emitting device layer comprises a plurality of light emitting devices electrically connected with the pads though the vias, and areas of the vias are in positive correlation with brightness of the light emitting devices; and
   a package layer disposed on the light emitting device layer;
   wherein the substrate comprises an electric current input side, and the areas of the vias close to the electric current input side are larger than the areas of the vias away from the electric current input side.

2. The backlight module as claimed in claim 1, wherein the light emitting device is a blue light emitting diode.

3. The backlight module as claimed in claim 1, wherein the substrate further comprises an optical film layer which is disposed on the package layer.

4. The backlight module as claimed in claim 3, wherein the optical film layer comprises a quantum dot film, a prism sheet, a diffuser film and a brightness enhancement film which are sequentially stacked and disposed on the package layer.

5. The backlight module as claimed in claim 1, wherein the package layer is made of transparent materials.

6. The backlight module as claimed in claim 1, wherein the material of the reflective layer is white ink.

7. The backlight module as claimed in claim 1, wherein the light emitting device comprises red light emitting diodes, green light emitting diodes and blue light emitting diodes, one of the red light emitting diodes, one of the green light emitting diodes and one of the blue light emitting diodes are arranged alongside with one another laterally or longitudinally forming a light emitting unit.

8. The backlight module as claimed in claim 7, wherein a plurality of the light emitting units are arranged in array.

9. The backlight module as claimed in claim 1, wherein a circuit board is disposed on the substrate, and the circuit board is used for driving the light emitting devices to emit light.

10. A display panel, comprising:
    a substrate on which a plurality of pads arranged in array are disposed;
    a reflective layer disposed on the substrate, vias which expose the pads are defined by the reflective layer;
    a light emitting device layer disposed on the reflective layer, wherein the light emitting device layer comprises a plurality of light emitting devices electrically connected with the pads though the vias, and areas of the vias are in positive correlation with brightness of the light emitting devices; and
    a package layer disposed on the light emitting device layer;
    wherein the substrate comprises an electric current input side, and the areas of the vias close to the electric current input side are larger than the areas of the vias away from the electric current input side.

11. The display panel as claimed in claim 10, wherein the light emitting device is a blue light emitting diode.

12. The display panel as claimed in claim 10, wherein the substrate further comprises an optical film layer which is disposed on the package layer.

13. The display panel as claimed in claim 12, wherein the optical film layer comprises a quantum dot film, a prism sheet, a diffuser film and a brightness enhancement film which are sequentially stacked and disposed on the package layer.

14. The display panel as claimed in claim 10, wherein the package layer is made of transparent materials.

15. The display panel as claimed in claim 10, wherein the material of the reflective layer is white ink.

16. The display panel as claimed in claim 10, wherein the light emitting device comprises red light emitting diodes, green light emitting diodes and blue light emitting diodes, one of the red light emitting diodes, one of the green light emitting diodes and one of the blue light emitting diodes are arranged alongside with one another laterally or longitudinally forming a light emitting unit.

17. The display panel as claimed in claim 16, wherein a plurality of the light emitting units are arranged in array.

18. The display panel as claimed in claim 10, wherein a circuit board is disposed on the substrate, the circuit board is used for driving the light emitting devices to emit light.

* * * * *